Nov. 1, 1927. 1,647,686
T. M. COSTAKOS
MEASURING FAUCET FOR CREAM
Filed June 20, 1924
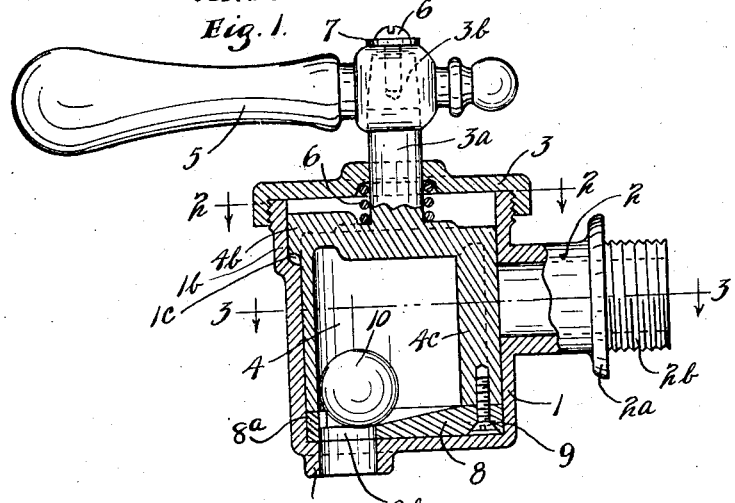
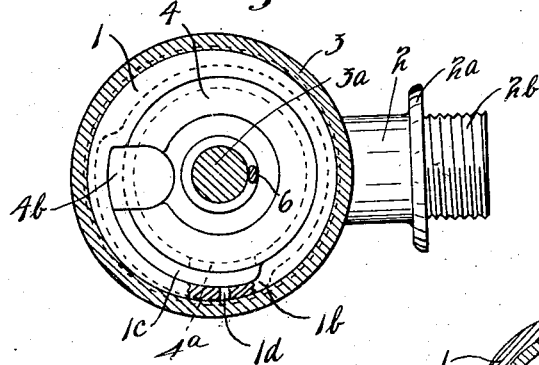
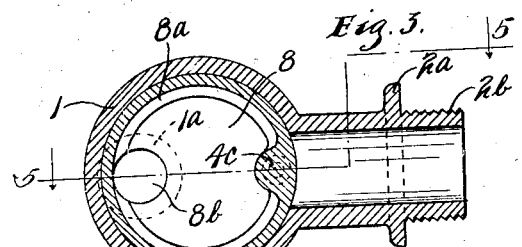
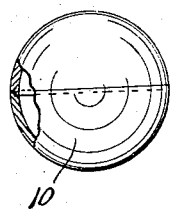
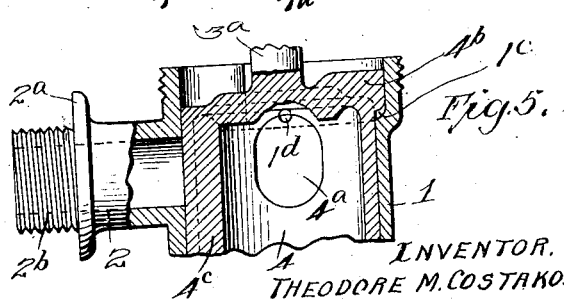
INVENTOR.
THEODORE M. COSTAKOS
BY HIS ATTORNEY.
James F. Williamson Patented Nov. 1, 1927.

1,647,686

UNITED STATES PATENT OFFICE.

THEODORE M. COSTAKOS, OF MINNEAPOLIS, MINNESOTA.

MEASURING FAUCET FOR CREAM.

Application filed June 20, 1924. Serial No. 721,219.

This invention relates to a device adapted to measure certain quantities of liquid drawn from a receptacle, and while the device may be used to measure any liquids, one particular use thereof is in measuring cream placed in coffee cups in a restaurant or lunch room. As is well known, the cream is usually placed in the cup before the coffee is drawn thereinto and if some measuring means is not used a great deal more cream will often be drawn than is necessary and the waiters, in some instances, place more cream in the cup for favored individuals. It is highly desirable therefore to have a measuring device for dispensing the cream. While it has been attempted to produce measuring devices or faucets of various types, in most cases the faucets are quite complicated and are, hence, very expensive so as to be beyond the means of the ordinary small lunch room or restaurant.

It is an object of this invention, therefore, to provide a measuring device or faucet of simple construction and one which can be marketed at a very low price so that the same can be purchased by small establishments.

It is a further object of this invention to provide such a faucet of simple construction and so arranged that it may be thoroughly and readily cleansed.

It is more specifically an object of the present invention to provide a measuring faucet having a casing and a shell in the casing, which shell has a removable bottom thereon.

These and other objects and advantages of the invention will be fully set forth in the following description made in connection with the accompanying drawings in which like reference characters refer to the same parts throughout the different views, and in which, Fig. 1 is a view partly in side elevation and partly in central vertical section through the faucet;

Fig. 2 is a horizontal section taken on the line 2—2 of Fig. 1;

Fig. 3 is a horizontal section taken on the line 3—3 of Fig. 1;

Fig. 4 is a central vertical section of a ball used in the device;

Fig. 5 is a partial vertical section taken on the line 5—5 of Fig. 3, as indicated by the arrow.

Referring to the drawings, the faucet comprises an outer casing 1. While this casing may be made in various shapes, in the embodiment of the invention illustrated the same is shown as substantially cylindrical and as having a depending short spout $1^a$ at one side of its bottom having a central opening communicating with the interior of the casing. A sleeve 2 extends from the side wall of said casing having a central opening communicating with the interior of the casing and having a collar $2^a$ thereon, a portion $2^b$ outward of said collar being threaded and adapted to be connected to a receptacle. The housing 1 has a segmental offset portion $1^b$ at its top forming a segmental recess $1^c$ extending one-quarter of the way around the casing and the casing is threaded adjacent its upper edge to receive a closing cap 3. The cap 3 is provided with a central boss or hub and is centrally apertured. Fitting in the casing 1 is a shell 4 illustrated as of hollow cylindrical form, which shell has a central upwardly extending stem $3^a$ fitting in the aperture in cap 3 and squared adjacent its upper end at $3^b$ to receive a handle member 5 held in place by a headed nut 6 threaded into said stem and seated on a washer 7. A spring 6 surrounds the stem $3^a$ and contacts at its ends the inside of cap 3 and the top of shell 4, respectively. The shell 4 has an opening $4^a$ in its side wall adapted to be moved into and out of alinement with the opening in sleeve 2. The shell 4 also has a laterally projecting lug $4^b$ at its top which is received and movable in the recess $1^c$, the ends of said recess forming stops for said lug $4^b$. The shell has its lower end closed by the bottom member or plate 8. This member has an opening $8^b$ therethrough at one side adapted to be moved into and out of alinement with the opening through spout $1^a$ in the rotation of shell 4. The top surface of plate 8 slopes downwardly toward the opening $8^b$, thus forming a depression in the top of plate 8 and forming a flange $8^a$ surrounding said depression, the top of said flange being disposed in a horizontal plane, as shown in Fig. 1, and being in tight engagement with the bottom of shell 4. At the side of plate 8 opposite opening $8^b$ the flange merges into the top surface of plate 8 and screw 9 extends through plate 8 into the lug 4$^c$ formed on one side of the shell 4, the head of said screw being countersunk in the bottom of plate 8. It will be seen that the bottom of plate 8 is seated in flat engagement with the bottom of the casing 1 and, together with shell 4, fits snugly in the walls of casing 1. The casing 1, preferably has a small vent hole 1$^d$ through its side wall immediately below the threaded portion at its upper end. The shell 4 is made of a certain capacity. If it is desired to discharge a small quantity of cream, as when small cups are used, the ball 10 shown in Fig. 4 is used and placed in the shell 4 so as to reduce the effective volume thereof. The ball 10 is made of two hemispheres suitably flanged and fitted together and then welded to form a substantially integral structure. The ball can be placed in the shell 4 by removing the bottom member 8. The ball 10 is of such size that it does not form an obstruction to prevent the milk or cream flowing through opening 8$^b$ and spout 1$^a$. The vent hole 1$^d$ registers with opening 4$^a$ in the discharging position of the faucet.

In operation, the faucet will be connected to an urn or dispensing receptacle, preferably adjacent the bottom thereof so that there will be considerable weight or pressure on the cream or other liquid dispensed. When the handle 5 is in one position with lug 4$^b$ at one end of recess 1$^c$ the opening 4$^a$ will be in communication with the opening in sleeve 2 and opening 8$^b$ will be out of registration with the opening through spout 1$^a$. Cream will thus flow into the interior of shell 4. Owing to the large opening 4$^a$ and the large diameter of sleeve 2 no venting is necessary when filling shell 4. When it is desired to discharge the cream the handle 5 will be swung to bring lug 4$^b$ at the other end of recess 1$^c$. Opening 4$^a$ will then be moved out of alinement with sleeve 2 and opening 8$^b$ will be brought into alinement with the opening through spout 1$^a$. The cream or other liquid will then be discharged through the spout 1$^a$. Owing to the large area of the opening 8$^b$ no vent will, positively, be necessary for the faucet but the vent hole 1$^d$ above described may be provided if desired so that opening 4$^a$ comes into alinement therewith and air can thus enter shell 4. The spring 6 holds the shell 4 and member 8 tightly down in the bottom of casing 1 so that a close fit is maintained. When it is desired to clean the device the cap 3 is unscrewed and shell 4 withdrawn from the casing 1. The closing member 8 can be swung to one side on the screw 9 as a pivot so that the interior of shell 4 can be thoroughly cleaned. The casing 1 can also be thoroughly cleaned and sterilized while the shell is removed. The parts are quickly assembled and re-assembled and thus capable of easy and quick sterilization. By having the discharge opening in the bottom of the device the liquid discharges very quickly and completely and a simpler structure and one very easily cleaned is provided.

From the above description it is seen that applicant has provided a very simple and efficient measuring faucet. The parts are few and simple and conveniently arranged for efficient operation. The device has been thoroughly demonstrated in actual practice and found to be very successful and efficient.

It will, of course, be understood, that various changes may be made in the form, details, arrangement and proportions of the parts without departing from the scope of applicant's invention, which, generally stated, consists in a device such as shown and described and defined in the appended claims.

What is claimed is:

1. A measuring faucet having in combination, a casing, having openings in its bottom and side, a shell disposed in said casing having openings adapted to be moved into and out of alinement with the openings in said casing, respectively, said shell having a plate forming the bottom thereof, and means for securing said plate in position whereby the same may be removed or swung to one side to facilitate cleaning of said shell.

2. A measuring faucet having in combination, a casing having openings in its bottom and side, a shell disposed in said casing having an opening adapted to be moved into and out of alinement with the opening in the side of said casing, a bottom member on said shell having an upstanding peripheral flange contacting the bottom edge of said shell, and means securing said bottom member and said shell together whereby it may be removed or swung to one side for cleaning said shell, said bottom member having its lower surface fitting flat against the bottom of the casing and having an opening therethrough adapted to be moved into and out of alinement with the opening in the bottom of said casing the upper surface of said bottom member sloping downwardly towards said opening therein.

3. A measuring faucet adapted to be connected to a receptacle having in combination, a substantially cylindrical casing disposed about a vertical axis and having a single opening through the side thereof communicating with said receptacle, said casing having a discharge spout adjacent one side at the bottom thereof with an opening extending therethrough into the casing, a shell disposed in and fitting snugly in said casing throughout its height and having an opening in its side adapted to be moved into and out of alinement with the opening in the side of said casing, said shell having a bottom member fitting flat against the bottom of said casing and removably secured to said shell and having an opening therein adapted to be moved simultaneously out of and into alinement with the opening in the spout of said casing, said shell having a closed top with a stem extending therefrom upwardly through said casing and provided with a handle, a coiled spring surrounding said stem between said top and the top of said shell, holding said shell pressed downwardly with its bottom firmly engaging the bottom of said casing, said bottom being flat.

In testimony whereof I affix my signature.

THEODORE M. COSTAKOS.